United States Patent [19]

Ezaki

[11] 4,386,465

[45] Jun. 7, 1983

[54] CUTTING APPARATUS FOR FROZEN FOOD

[76] Inventor: Norio Ezaki, 7-33 Kohama Nishi 2-chrome, Suminoe-ku, Osaka, Japan

[21] Appl. No.: 249,415

[22] Filed: Mar. 31, 1981

[51] Int. Cl.³ .............................................. B26D 3/24
[52] U.S. Cl. ....................................... 30/114; 83/140; 83/459; 83/460; 83/556; 83/561
[58] Field of Search .................... 30/114; 83/556, 559, 83/561, 459, 460, 461, 140

[56] References Cited

U.S. PATENT DOCUMENTS 1,800,706  4/1931  Turnquist ............................... 30/114
2,707,504  5/1955  Hill ......................................... 30/114

Primary Examiner—James M. Meister
Attorney, Agent, or Firm—Fisher, Christen & Sabol

[57] ABSTRACT

Apparatus for cutting frozen food is supported on a table provided with a series of grasping members surrounding the food and resiliently urged inwardly so that when a vertically reciprocable cutting blade cuts the frozen food, the severed pieces of food are restored to their original positions so that a subsequent cut made in an angularly related position in the food will subdivide the food in equal portions. A series of press plates are mounted for vertical movement with the cutting blade to resiliently bear against the top of the food while being cut to prevent upward tilting of the pieces being severed.

5 Claims, 12 Drawing Figures

4,386,465

CUTTING APPARATUS FOR FROZEN FOOD

BACKGROUND OF THE INVENTION

This invention relates to a cutting apparatus for frozen food such as frozen ice-cream cake or the like.

Food of such type is likely to slide on a table on which it is placed, during cutting operation, and this makes it difficult to hold same suitable in position relative to a cutting blade moving up and down along a fixed path of movement. Moreover, cut pieces of the food may possibly jump sidewardly during cutting operation.

BRIEF SUMMARY OF THE INVENTION

This invention provides a cutting apparatus which eliminates the difficulties enumerated above by the provision of gripping members placed around the side of a piece of frozen food, which gripping members are resiliently urged inwardly to restore the pieces of frozen food to their original positions after they have been displaced outwardly by the cutting blade. When the holding table is subsequently rotated, the frozen food is always centered under the cutting blade so that equal portions will be cut.

One preferred embodiment of this invention will now be explained with reference to the accompanying drawings.

DETAILED DESCRIPTION OF THE INVENTION

Figure 1:
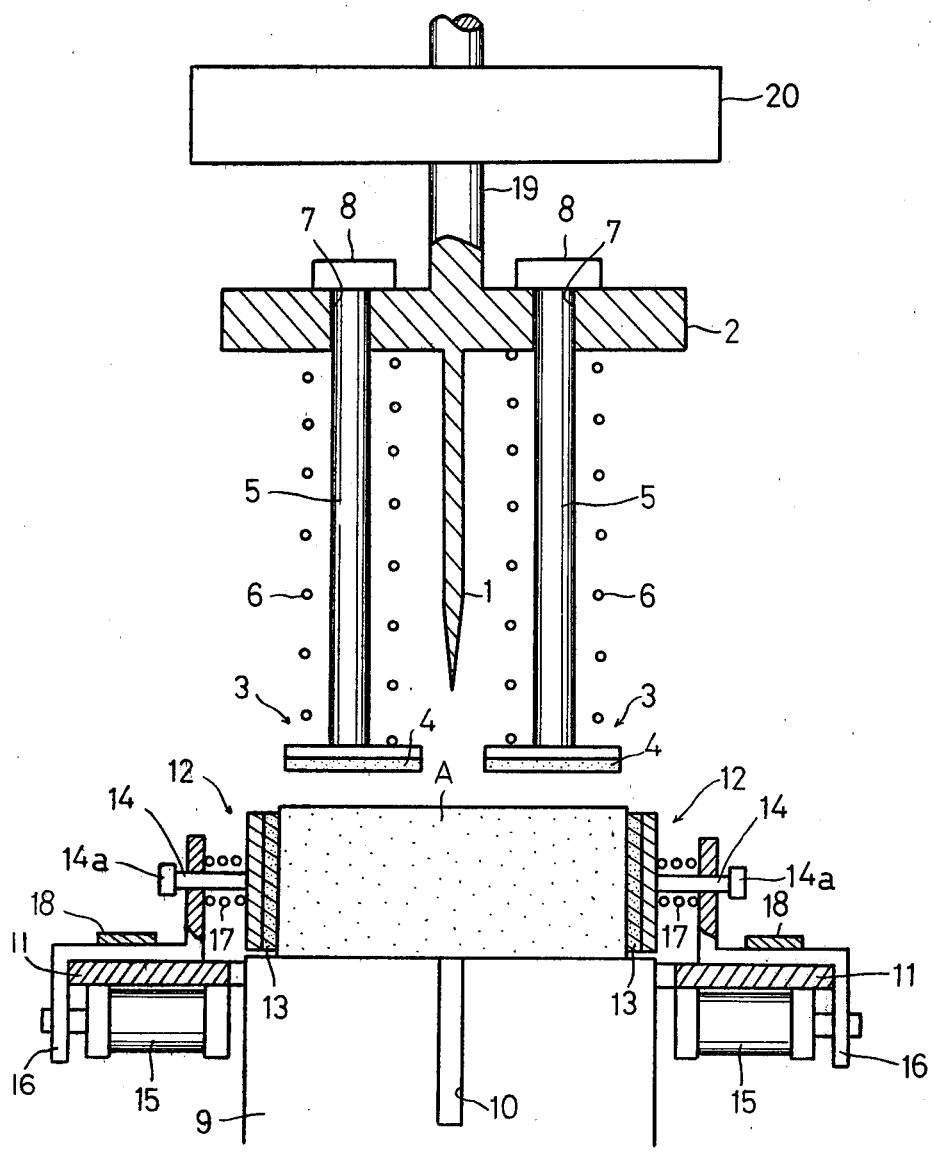
FIG. 1 is a vertical section showing a preferred embodiment of the invention.
Figure 2:
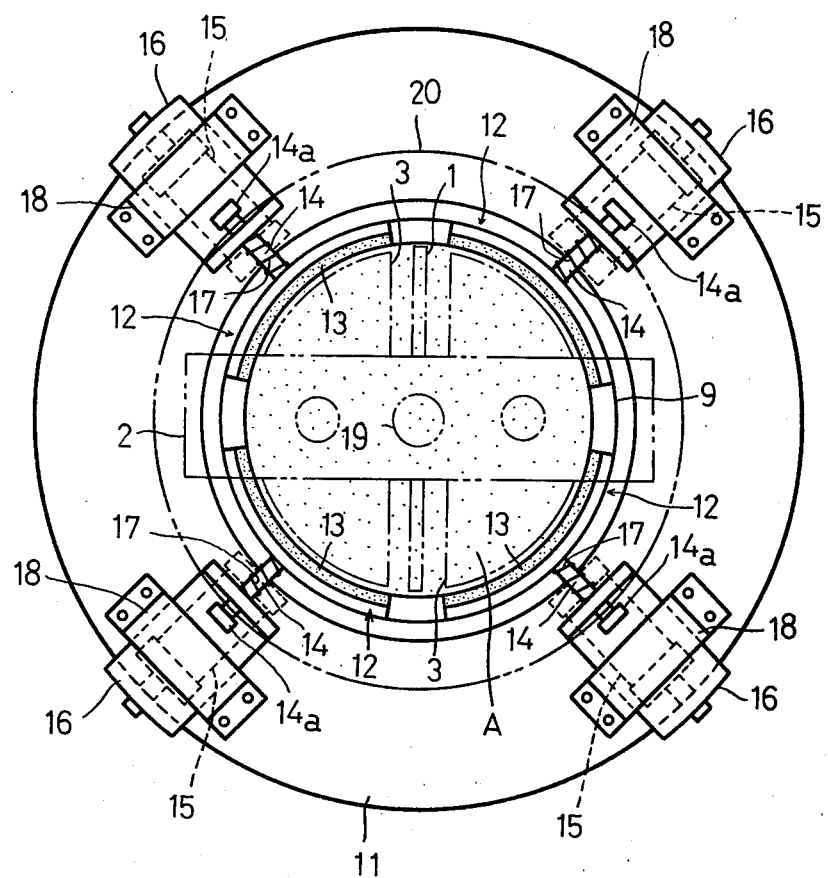
FIG. 2 is a top plan view of the apparatus shown in FIG. 1.
Figure 3:
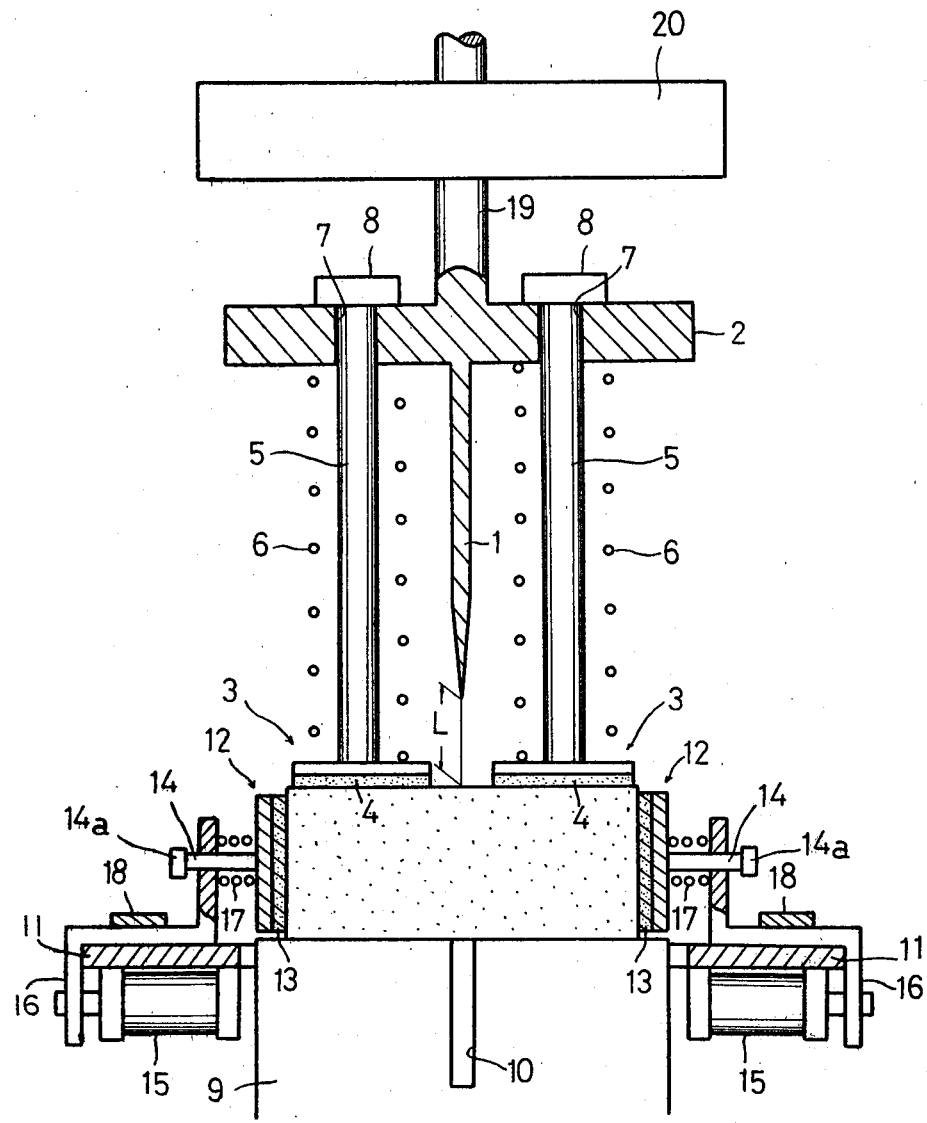
FIG. 3 is an explanatory view illustrating the operation of the press plates.
Figure 4:
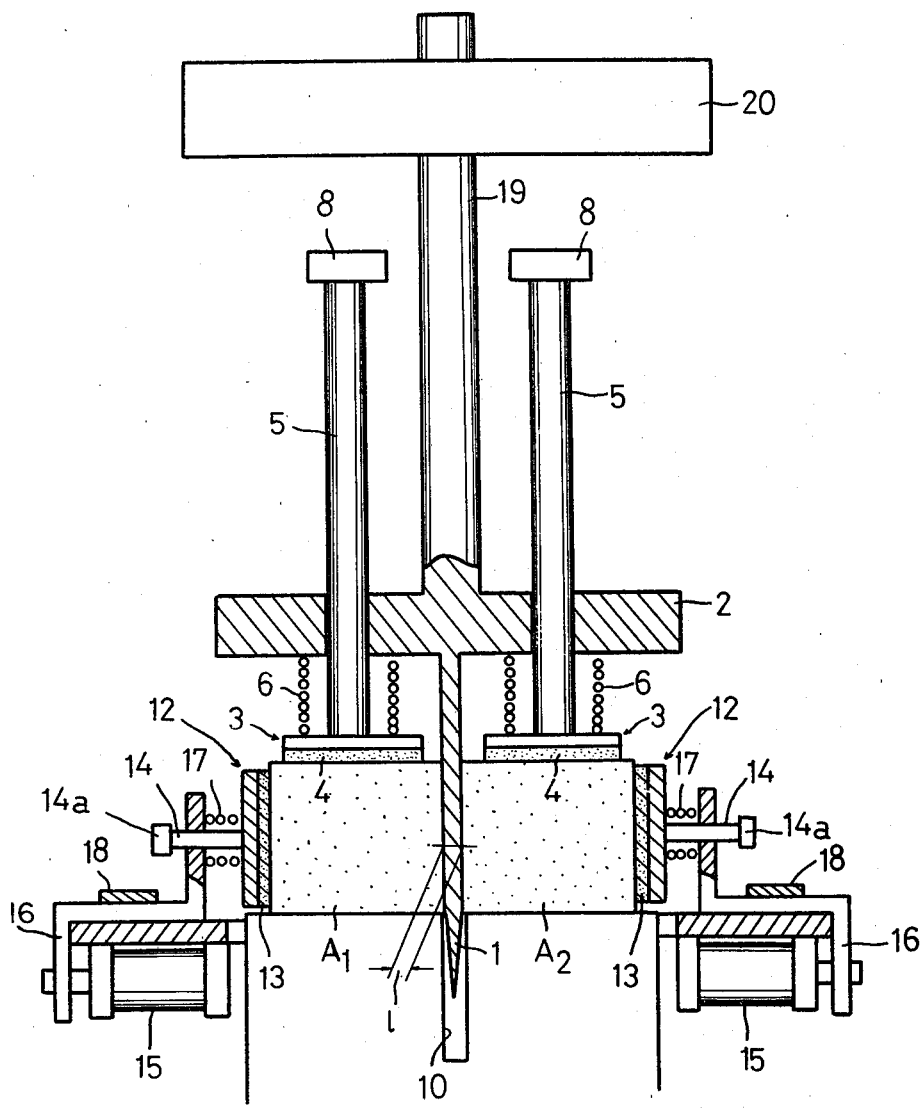
FIG. 4 is an explanatory view showing a cake as it is cut in equal parts.

FIG. 1 shows an apparatus according to the invention in vertical section, and FIG. 2 presents a top plan view of same. As can be seen, a cutting blade 1 extends downwardly from an up-and-down movable plate 2 which is actuated by a mechanism not shown (e.g., a crank mechanism) to move downwardly and upwardly. Press plates 3, 3, provided for pressing a piece of frozen food or frozen ice-cream cake A on the top thereof, have resilient members, 4, 4 which are to come into direct contact with the top of cake A. Rods 5, 5 attached to the press plates 3, 3 are slidable through holes 7, 7 in the movable plate 2 via springs 6, 6 being provided with retainer heads 8, 8 at the top end. As FIGS. 3 and 4 illustrate, therefore, during the downward movement of the movable plate 2, the press plates 3, 3 come into contact with the top of the cake A before the cutting blade 1 cuts into the cake A. During the upward movement of the cutting blade 1, the press plates 3, 3 leave the cake A to release it of pressure after the departure of the cutting blade 1 from the cake A. For the purpose of the above operation there is provided a distance L between the upper end of each press plate 3 and the tip end of the cutting blade 1 and further the springs 6, 6 are adapted to provide a suitable degree of resiliency so that the entire operation can be performed in an integral pattern. The table 9 for placing cake A is provided with a groove 10 into which the tip of the cutting blade 1 is introduced as it cuts the cake A.

Around the top portion of the table 9 there is provided an annular base plate 11 having grasping members 12 disposed so as to encircle cake A. The grasping members 12 are provided, on their inner side, with resilient members 13 which are to come in direct contact with cake A. Rods 14 for supporting the grasping members 12 are resiliently movably mounted, with the help of springs 17, on the upstanding portions of slide levers 16 which are radially outwardly slidable on the base plate 11 through air cylinders 15. At 18 there are provided support frames for supporting the slide levers 16. Designated by 14a are retainer heads for the rods 14. Above the movable plate 2 there is provided a turn shaft 19 which is interlocked with intermittent drive means 20 (e.g., ratchet mechanism), so that the cutting blade 1 can be intermittently caused to turn by means of the turn shaft 19 at the end of each reciprocal movement of the cutting blade 1.

Figure 7:
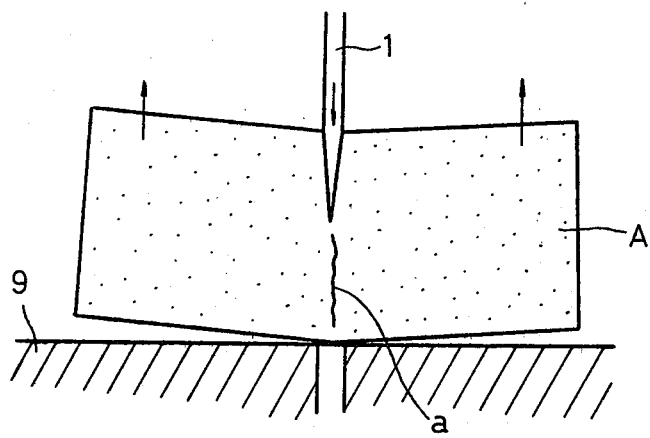
FIG. 7 is a vertical cross sectional explanatory view showing a cake as it is being cut by a conventional cutting apparatus.
Figure 8:
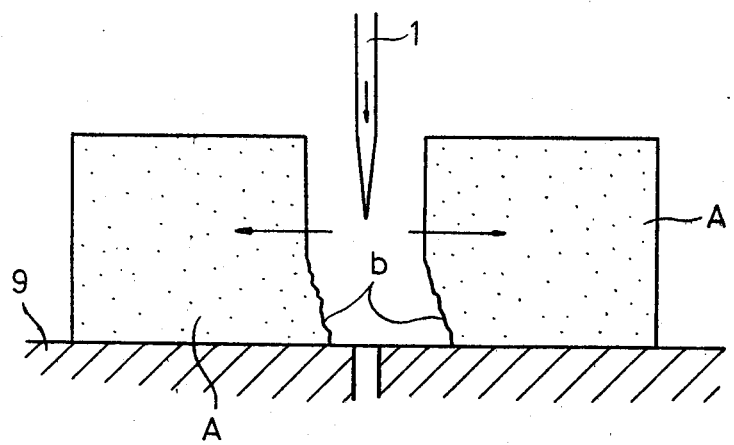
FIG. 8 is a vertical cross sectional explanatory view showing a cake after it has been cut by a conventional cutting apparatus.

As FIG. 1 illustrates, a piece of frozen ice-cream cake A, when placed on the table 9, is held in position with its periphery brought in resilient contact with the grasping members 12. With the downward movement of the movable plate 2 from which the cutting blade 1 extends downwardly, as can be seen from FIG. 3, the press plates 3, 3 press the cake A on the top thereof through the resilient members 4, 4 before the cutting blade 1 cuts into the cake A, because a distance L is kept between the press plates 3, 3 and the tip end of the cutting blade 1. The movable plate 2, as FIG. 4 shows, moved downward further until the tip of the cutting blade 1 enters the groove 10 on the table 9. Thereupon, the grasping members 12 are pushed outwardly against the force of the springs 7, 7 over a small distance corresponding to the thickness l of the cutting blade 1 which has cut into the cake A, while the press plates 3, 3 keep on pressing the top of the cake A through the resilient members 4, 4 under the force of the springs 6, 6. If the top side and/or periphery of the cake A are not supported by such press plates 3, 3 and/or grasping members 12, 2 when the cake A is cut, as FIG. 7 shows, the top of the frozen cake A, at both end portions thereof, is bound to be thrust upwardly in the direction of the arrows instantly the cutting blade 1 cuts into the cake A, so that the central bottom portion of the cake A may crack, as indicated at "a," instead of being cut before the cake A is fully cut by the cutting blade 1 into equal parts. And, as FIG. 8 illustrates, the cut portions of the cake A may be forced to jump in the sideward directions as indicated by the arrows before the cutting blade 1 cuts the cake A as completely as it enters the groove 10 on the table 9, with the result that the bottom portions of cut pieces of the cake A may have irregular cut surfaces b as shown which represent the traces of said crack a. Such happening is attributable to the thickness 1 of the cutting blade 1 and/or the hardness of the object to be cut. The present invention overcomes this difficulty by the provision of press plates 4, 4 and grasping members 12 which both arrest the force applied in the directions of the arrows shown in FIGS. 7 and 8, so that cake A can be neatly cut without the cut surfaces being damaged in any way.

Figure 9:
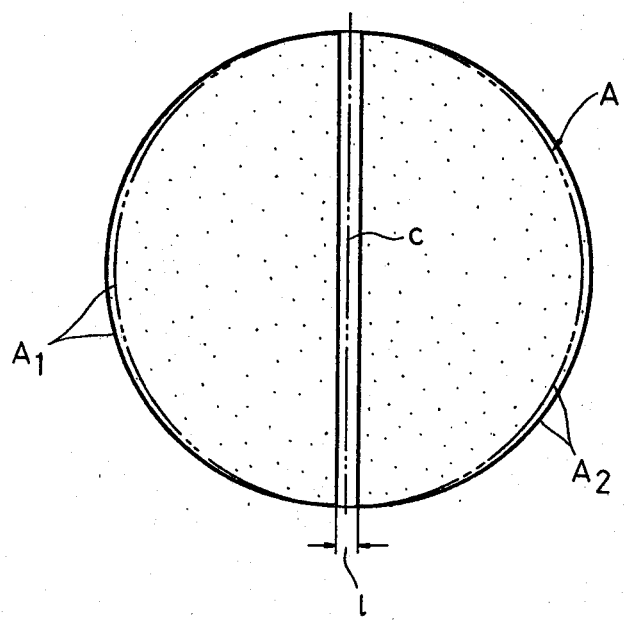
FIG. 9 is a plan view of a cake after it has been cut by a conventional cutting apparatus.

After the cake A is completely cut by the cutting blade 1 as shown in FIG. 4, the movable plate 2 moves back upwardly. While, the press plates 3, 3 and grasping members 12 remain in resiliently pressing contact with the top side of the cake A and the periphery thereof respectively even after the movement of the cutting blade 1 away from the top side of the cake A. Thus, as FIG. 9 shows, the cake A as shown by the imaginary lines has been cut into two equal parts A1, A2 in such a way that a distance l corresponding to the width l of the cutting blade 1 is defined by and between them as shown by the full lines (also, see FIG. 4). When the movable plate 2 has moved upward to the extent that the cutting blade 1 is slightly apart from the top side of the cake, the press plates 3, 3 and grasping members 12 still remain in pressing contact with the top side of the cake and the periphery thereof; and as the movable plate 2 moves further upward, the force of the springs 6, 6 against the press plates 3, 3 become weak, and the pressing force of the grasping members 12 becomes relatively strong so that the cut pieces of the cake are brought into close contact with each other, filling up the distance l, with cut line c in between as shown in FIG. 9.

Figure 5:
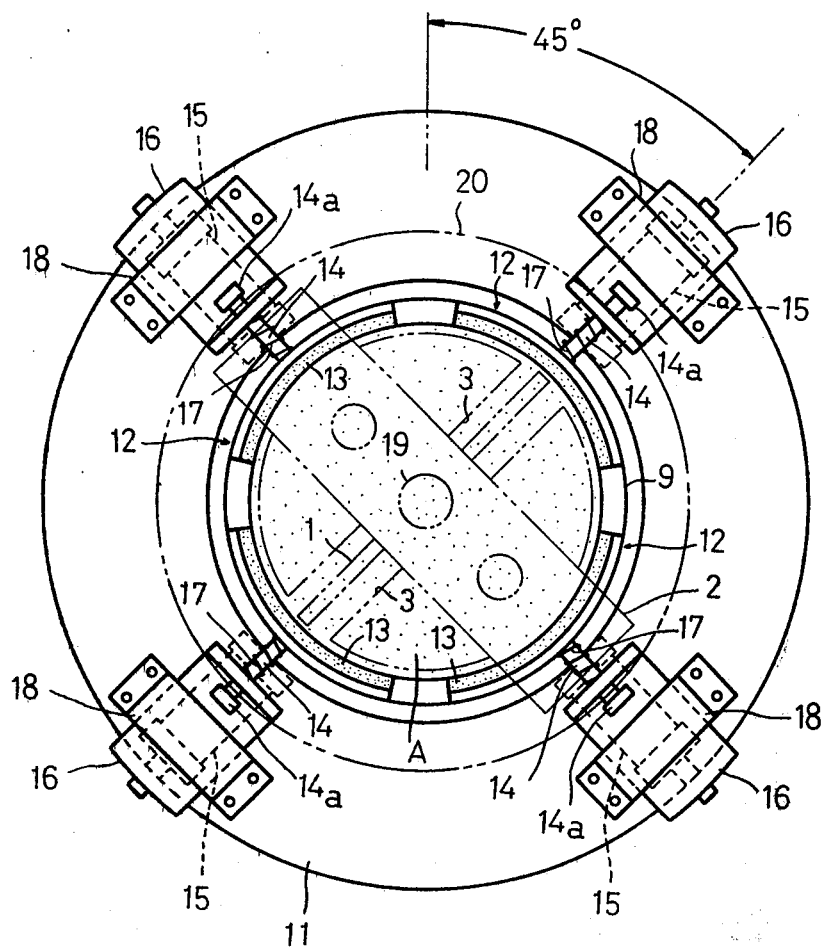
FIG. 5 is an explanatory view showing movement of a cutting blade as it is turned 45° clockwise.
Figure 6:
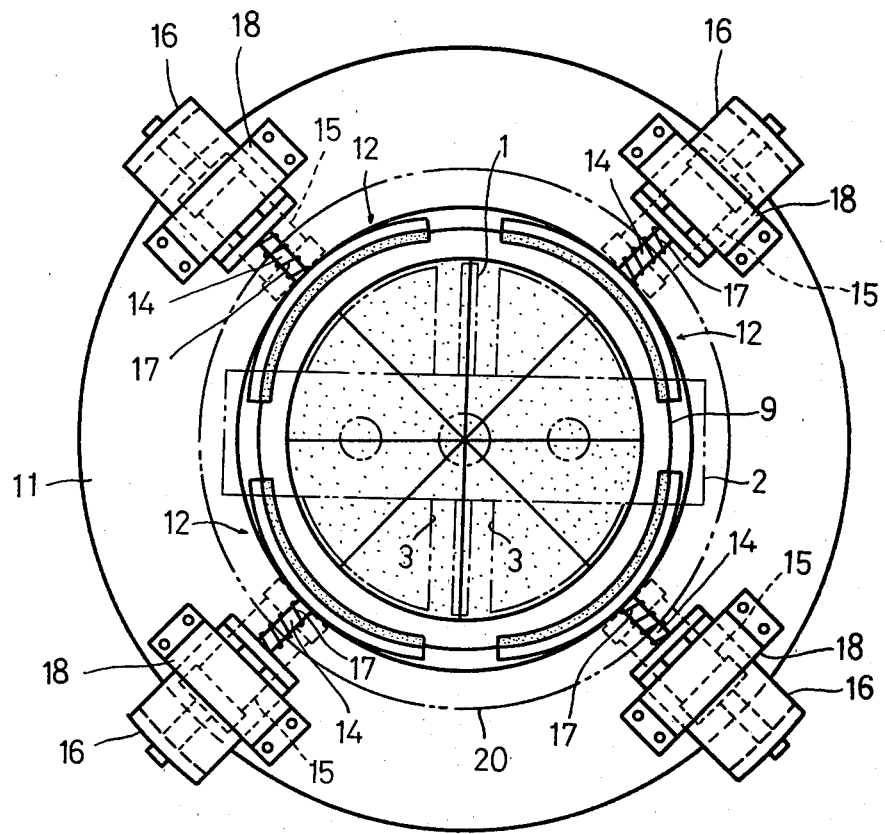
FIG. 6 is an explanatory view showing grasping members as they are positioned away from the periphery of the cake after cutting operation.

While the cake is so held in position with its periphery pressed by the grasping members 12, the movable plate 2 moves upward still further, and immediately upon the return of the press plates to the position as shown in FIG. 1, that is, to the state of their being positioned apart from the top side of the cake, the cutting blade 1 is actuated by the intermittent drive means 20 to turn several equal angles: for examples, four times 45° each as shown in FIG. 5.

By repeating intermittent turn of the cutting blade 1, a given degree of angle each time, while the cake A is held in position with its periphery pressed by the grasping members 12, it is possible to cut the cake A into several equal parts.

Figure 10:
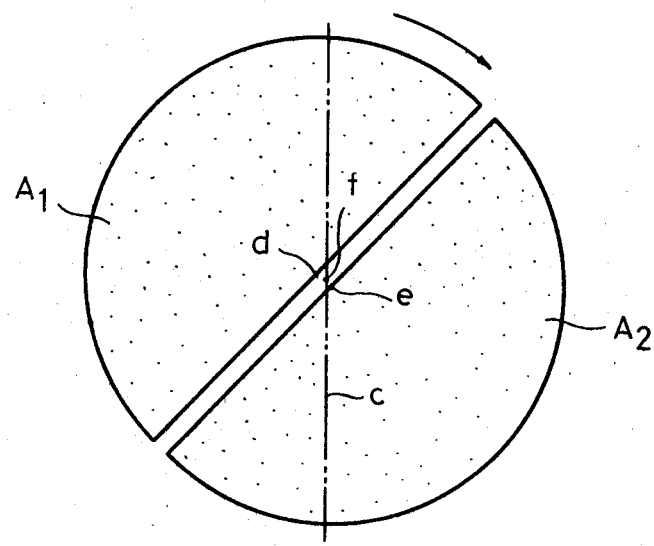
FIG. 10 is a plan view of the cut cake of FIG. 9 after it has been partially rotated in preparation for a second cut.
Figure 11:
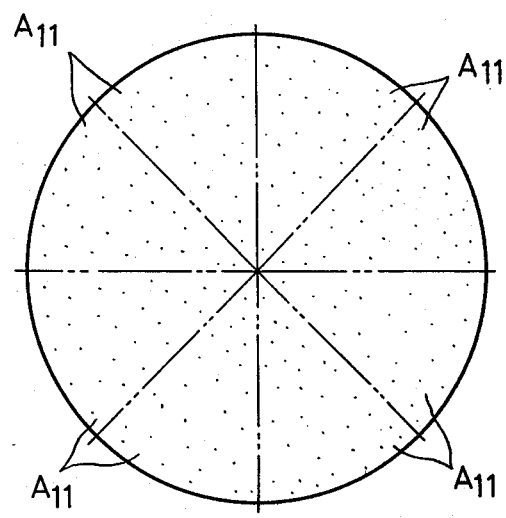
FIG. 11 is a plan view of a cake cut by the apparatus of this invention.
Figure 12:
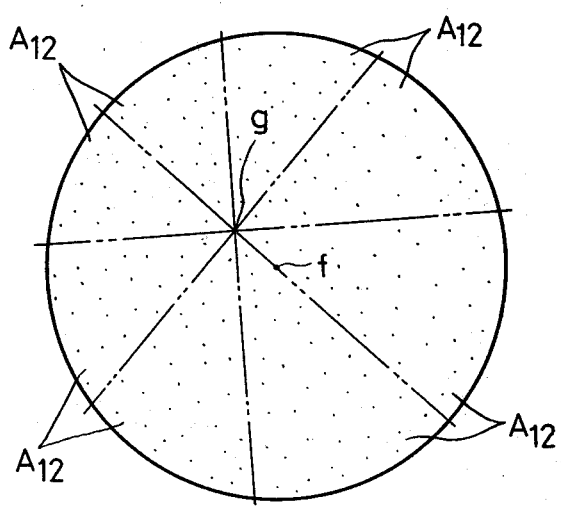
FIG. 12 is a plan view showing the irregular portions cut by conventional apparatus.

If the semi-circular cakes A1, A2 with a distance l corresponding to the width l of the cutting blade 1 between them as shown in FIG. 9 are further cut without their cut surfaces being brought in contact by means of the grasping members 12, and by rotating them (by means of a turnable, for example) as they have the distance l as shown in FIG. 10, the respective centers d, e of the semi-circular cakes A1, A2 are bound to deviate from the center f of the cut line c. Therefore, if the cakes as such are cut along the cut line c, the result is that eight cut cakes, slightly different in shape from one another, are obtained. On the other hand, if the center "f" of the cake A is always taken as the regular center with the help of the grasping members 12, the cake A can be cut in exactly eight equal parts. As FIG. 12 shows, however, where grasping members 12 are not provided, if cutting is made at center g, a center deviating from regular center f, while rotating the cakes, eight irregularly cut cakes A12 are obtained. The grasping members 12, as FIG. 11 shows, permit the center of the cake under cutting to be exactly determined, thereby serving to ensure that the cake will be cut without a deviation from the regular center.

It may be added that the cake A can be cut in several equal parts in various ways by changing the ratchet in the intermittent drive means 20 or selectively using a plurality of ratchets therein.

As above described, the apparatus according to the invention is so arranged as to prevent the slip and movement of frozen food to hold it in position during cutting operation. In accordance with the invention, therefore, it is possible to hold frozen food in position relative to the up-and-down reciprocating cutting blade, without the frozen food being allowed to slip or move on the table during cutting operation. Further, the apparatus eliminates the possibility of cut pieces of cake bouncing sidewardly or getting damaged during the cutting operation.

What is claimed:

1. A cutting apparatus for frozen food comprising grasping members 12 encircling and resiliently holding therein a piece of frozen food A placed on a frozen food placing table 9, a cutting blade 1 movable downwardly from above said table 9 and having at least a width substantially corresponding to the size of said piece of frozen food A, and intermittent drive means 20 for intermittently turning said cutting blade 1 above said piece of frozen food A held in said grasping members 12 at the end of each up-and-down reciprocation of said cutting blade 1, the arrangement being such that said cutting blade 1 is adapted to be moved downwardly and upwardly relative to said piece of frozen food A as the latter is held in said grasping members 12 and to be intermittently turned at end of each such up and down reciprocation so that said piece of frozen food A can be cut into equal sectoral parts.

2. A cutting apparatus as claimed in claim 1, wherein said cutting blade 1 has at least a width substantially corresponding to the size of said piece of frozen food A.

3. A cutting apparatus as claimed in claim 1, wherein said grasping members 12 encircle and resiliently hold therein a piece of frozen food A placed on said frozen-food placing table 9.

4. A cutting apparatus as claimed in claim 1 or 2, wherein said apparatus comprises press plates 3, 3 adapted to press said piece of frozen food on the top thereof in cooperation with said cutting blade 1 during the downward movement thereof.

5. A cutting apparatus as claimed in claim 1, wherein said grasping members 12 are mounted to be positioned away from the periphery of said piece of frozen food A before the start of up-and-down movement of said cutting blade 1, to be so positioned as to resiliently hold said piece of frozen food A on the periphery thereof simultaneously with or immediately before the start of movement of said cutting blade 1, and to be again positioned away from the periphery of said piece of frozen food A when same is cut into equal sectoral parts, whereupon the movement of said cutting blade 1 is stopped accordingly.

* * * * *